United States Patent
Fan et al.

(10) Patent No.: US 11,628,410 B2
(45) Date of Patent: Apr. 18, 2023

(54) MODIFIED POROUS MEMBRANE MATERIAL AND PREPARATION METHOD THEREOF, AND LIQUID MEMBRANE SEPARATION METHOD OF CARBON DIOXIDE

(71) Applicant: NANJING TECH UNIVERSITY, Nanjing (CN)

(72) Inventors: Yiqun Fan, Nanjing (CN); Peng Xu, Nanjing (CN); Minghui Qiu, Nanjing (CN); Kaiyun Fu, Nanjing (CN); Xianfu Chen, Nanjing (CN); Xiangli Kong, Nanjing (CN); Dawei Gong, Nanjing (CN)

(73) Assignee: NANJING TECH UNIVERSITY, Nanjing (CN)

( * ) Notice: Subject to any disclaimer, the term of this patent is extended or adjusted under 35 U.S.C. 154(b) by 0 days.

(21) Appl. No.: 17/623,274

(22) PCT Filed: Jun. 17, 2020

(86) PCT No.: PCT/CN2020/096504
§ 371 (c)(1),
(2) Date: Dec. 28, 2021

(87) PCT Pub. No.: WO2021/031675
PCT Pub. Date: Feb. 25, 2021

(65) Prior Publication Data
US 2022/0362721 A1 Nov. 17, 2022

(30) Foreign Application Priority Data
Aug. 21, 2019 (CN) .......................... 201910773801.4

(51) Int. Cl.
*B01D 71/82* (2006.01)
*B01D 53/14* (2006.01)
(Continued)

(52) U.S. Cl.
CPC ......... *B01D 71/82* (2013.01); *B01D 53/1475* (2013.01); *B01D 53/1493* (2013.01);
(Continued)

(58) Field of Classification Search
None
See application file for complete search history.

(56) References Cited

U.S. PATENT DOCUMENTS

2014/0060324 A1\* 3/2014 Ahn ................... B01D 67/0006
96/10

FOREIGN PATENT DOCUMENTS

| CN | 103534012 A | 1/2014 |
| CN | 103638780 A | 3/2014 |

(Continued)

OTHER PUBLICATIONS

Mayur Ostwal, et al., 3-Aminopropyltriethoxysilane functionalized inorganic membranes for high temperature CO2/N2 separation, Journal of Membrane Science, 2011, pp. 139-147, vol. 369.

*Primary Examiner* — Jason M Greene
(74) *Attorney, Agent, or Firm* — Bayramoglu Law Offices LLC

(57) ABSTRACT

A membrane modification method for improving liquid membrane separation of carbon dioxide ($CO_2$) includes grafting an organic substance containing an amine group on a porous membrane material, and loading water into pore channels of the porous membrane material to prepare a supported liquid membrane for a gas mixture separation experiment of $CO_2$. In the method, the amine group is introduced through chemical grafting to make the water being alkaline when used as membrane liquid. Compared with an alkaline solution as the membrane liquid, the method can avoid the loss of active alkaline substances and increase the permeation flux of $CO_2$.

7 Claims, 2 Drawing Sheets

(51) Int. Cl.
*B01D 53/22* (2006.01)
*B01D 67/00* (2006.01)
*B01D 69/02* (2006.01)
*B01D 69/04* (2006.01)
*B01D 69/06* (2006.01)
*B01D 71/02* (2006.01)

(52) U.S. Cl.
CPC ......... *B01D 53/228* (2013.01); *B01D 53/229* (2013.01); *B01D 67/0079* (2013.01); *B01D 69/02* (2013.01); *B01D 69/04* (2013.01); *B01D 69/06* (2013.01); *B01D 71/024* (2013.01); *B01D 2252/103* (2013.01); *B01D 2257/504* (2013.01); *B01D 2323/08* (2013.01); *B01D 2323/21834* (2022.08); *B01D 2325/02833* (2022.08); *B01D 2325/02834* (2022.08)

(56) References Cited

FOREIGN PATENT DOCUMENTS

| | | |
|---|---|---|
| CN | 104772044 A | 7/2015 |
| CN | 104801201 A | 7/2015 |
| CN | 105032209 A | 11/2015 |
| CN | 107519772 A | 12/2017 |
| CN | 107983173 A | 5/2018 |
| CN | 108126650 A | 6/2018 |
| CN | 110624424 A | 12/2019 |
| JP | 2007044677 A | 2/2007 |

* cited by examiner

MODIFIED POROUS MEMBRANE MATERIAL AND PREPARATION METHOD THEREOF, AND LIQUID MEMBRANE SEPARATION METHOD OF CARBON DIOXIDE

CROSS REFERENCE TO THE RELATED APPLICATIONS

This application is the national phase entry of International Application No. PCT/CN2020/096504, filed on Jun. 17, 2020, which is based upon and claims priority to Chinese Patent Application No. 201910773801.4, filed on Aug. 21, 2019, the entire contents of which are incorporated herein by reference.

TECHNICAL FIELD

The present invention relates to modification of membrane materials, and specifically to amination modification of a membrane material of a supported liquid membrane and use thereof in improving carbon dioxide ($CO_2$) separation.

BACKGROUND

In recent years, the greenhouse effect is one of the major environmental issues that attracts global attention, and is mainly caused by $CO_2$ emissions from power plants, steel plants and chemical plants. From the perspective of preventing global warming, it has become a top priority to develop an efficient $CO_2$ capture and recovery technology. In addition, $CO_2$ is also found in natural gas with $CH_4$ as a main component, and needs to be recovered and removed during natural gas extraction to prevent from corroding gas pipelines in gas transportation. In addition, there are many to-be-treated systems containing $CO_2$ that needs to be removed.

At present, $CO_2$ separation and capture are mainly implemented through cryogenic liquefaction separation, adsorbent separation, adsorption and membrane separation. An amine chemical adsorption method of the $CO_2$ is relatively mature and has been industrially applied (CN103638780A). However, after adsorbing the $CO_2$, alcohol amines need to be heated for desorption and may be degraded due to excessively high temperature, thereby reducing regeneration and circulation rate of adsorbents. In addition, gas desorption towers have an energy consumption accounting for 75% of the cost of the entire $CO_2$ capture system, and amine solvents have a strong corrosive effect on the equipment, such that the economic efficiency of $CO_2$ capture is severely reduced. In addition, the amine adsorption method can hardly have any further breakthroughs due to its own characteristics. The cryogenic liquefaction separation has a relatively simple principle, but requires large energy consumption, relatively high cost and relatively many large-sized equipments. The adsorption method requires variable pressures, variable temperatures or both, and has relatively complicated steps. The membrane separation is relatively novel. However, a purity of $CO_2$ obtained through the membrane separation is not desirable, and can hardly exceed a "Robeson upper bound", that is, the membrane materials cannot obtain a high permeation rate or high selectivity at the same time.

At present, the supported liquid membrane has a desirable breakthrough in achieving high selectivity and high gas permeance. Therefore, it has been gradually appreciated by researchers for gas separation. Ionic liquids are well used in supported liquid membranes due to high $CO_2$ dissolution selectivity and low volatility. However, due to a relatively small surface tension, the ionic liquids have high requirements on the pore size distribution and size of the membranes and cannot withstand a high transmembrane pressure difference, resulting in easy loss of ionic liquids. This further leads to secondary pollution to the environment. In addition, ionic liquids are cost-ineffective, and thus cause large economic burden.

In addition, a liquid membrane separation method featuring self-support by a porous membrane using ionic liquid in the prior art has complicated steps during the actual operation. In the method, the liquid membrane needs to be re-constituted after replacing the use site of the separation equipment, leading to additional operation steps and acquisition of raw materials.

SUMMARY

To prevent loss of membrane liquid of the supported liquid membrane and to retain the high $CO_2$ effect of the ionic liquid, the present invention provides an amination modification method of a membrane material for improving separation of $CO_2$ by a water-supported liquid membrane.

In a first aspect, the present invention provides the following technical solution.

A modified porous membrane material is provided, where the membrane material is an inorganic porous material modified with an amine-containing group in pore channels.

In an embodiment, the amine-containing group is one selected from the group consisting of a primary amine-containing group, a secondary amine-containing group and a tertiary amine-containing group.

In an embodiment, the inorganic porous material is selected from the group consisting of porous alumina, porous titania, porous zirconia and porous silica.

In an embodiment, the membrane material has an average pore size of 1-200 nm.

In an embodiment, the membrane material geometrically has a flat-plate structure or a tubular structure.

In a second aspect, the present invention provides the following technical solution.

A preparation method of the modified porous membrane material includes the following steps:

dissolving a silane coupling agent containing an amine group in an organic solvent to serve as a modifier; immersing a porous membrane material in the modifier for a grafting reaction; and after the grafting reaction is completed, performing washing and drying to obtain the modified porous membrane material.

In an embodiment, the silane coupling agent containing the amine group is selected from the group consisting of N,N-dimethyl-3-aminopropyltrimethoxysilane and (3-aminopropyl)trimethoxysilane.

In an embodiment, the organic solvent is at least one selected from the group consisting of ethanol, acetone, dimethylacetamide (DMAC) and tetrahydrofuran (THF).

In an embodiment, the grafting reaction is performed at 20-40° C. for 1-24 h.

In a third aspect, the present invention provides the following technical solution.

A liquid membrane separation method of $CO_2$ includes the following steps:

loading water as a solvent into pore channels of the modified porous membrane material to form a liquid membrane; and allowing the liquid membrane to contact with a gas mixture containing $CO_2$ to make the $CO_2$ permeate a membrane layer.

In an embodiment, the gas mixture containing $CO_2$ further includes at least one selected from the group consisting of $N_2$, $CH_4$, $H_2$, $O_2$, He and CO.

In a fourth aspect, the present invention provides the following technical solution.

Use of the modified porous membrane material in improving a separation factor or a permeation flux during liquid membrane separation of $CO_2$ is provided.

Beneficial Effects

In the present invention, it is found that after a surface of porous ceramic materials is modified with amine groups, the amine groups can be fixed on the surface of the materials, and liquid membrane separation of $CO_2$ can also be achieved by using this structure.

In the present invention, polymer functional materials containing amine groups are grafted on the membrane materials, which not only meets the needs of selective separation and permeation enhancement for liquid membranes, but also avoids membrane liquid loss caused by using ionic liquids.

In the present invention, the porous membrane material is subjected to amination modification to graft a carrier that enhances transfer on the membrane surface by immobilization, thereby avoiding the loss of effective alkaline substances, and a membrane solvent used in this experiment is environmentally friendly water. In addition, in the case of the loss of membrane liquid, the liquid membrane can be easily repaired using the hydrophilicity and the pore size of the membrane material by capillary condensation under a $CO_2$ gas mixture containing water vapor. This method can improve the stability of the supported liquid membrane and has easy operation.

In the method of the present invention, the amine groups are directly immobilized inside the porous materials, the separation equipment can be moved directly when use site replacement is needed, and easily-available water can be directly used as a medium without re-preparing complex liquid membranes, thereby greatly improving the ease of device and equipment during use.

DETAILED DESCRIPTION OF THE EMBODIMENTS

In the technical scheme of the present invention, a silane coupling agent containing amine groups is added dropwise to an organic solvent to dissolve to prepare a modifying solution, a porous membrane material is immersed in the modifying solution for reaction, and washed and dried after the reaction to obtain a membrane material rich in amine groups. Under surface tension, water is loaded in membrane pore channels, and a prepared supported liquid membrane is used to separate a $CO_2$ gas mixture.

In the present invention, the modification method of supported materials is simple and easy to implement. The method can help avoid membrane fluid loss caused by using ionic liquids (with relatively high requirements for the pore size), and the amine groups are introduced to improve the selective separation of $CO_2$ by water-supported liquid membranes.

In the present invention, the membrane liquid used in the prepared water-supported liquid membrane is a green solvent with no pollution to the environment, low cost and easily-available source.

In the present invention, the porous membrane material has hydrophilicity, which makes it convenient to add water vapor to the $CO_2$ gas mixture to repair liquid membrane by capillary condensation.

A modified porous membrane material is modified with an amine-containing group in pore channels.

In an embodiment, the amine-containing group is one selected from the group consisting of a primary amine-containing group, a secondary amine-containing group and a tertiary amine-containing group.

In an embodiment, the membrane material is an inorganic porous membrane material or a polymer porous membrane material.

In an embodiment, the inorganic porous material is selected from the group consisting of porous alumina, porous titania, porous zirconia and porous silica.

In an embodiment, the membrane material has an average pore size of 1-200 nm.

In an embodiment, the membrane material has a flat-plate structure or tubular structure.

A preparation method of the modified porous membrane material includes the following steps.

A silane coupling agent containing an amine group is dissolved in an organic solvent to serve as a modifier. A porous membrane material is immersed in the modifier for grafting reaction. After the grafting reaction is completed, washing and drying are performed to obtain the modified porous membrane material.

In an embodiment, the silane coupling agent containing the amine group is selected from the group consisting of N,N-dimethyl-3-aminopropyltrimethoxysilane and (3-aminopropyl)trimethoxysilane.

In an embodiment, the organic solvent is at least one selected from the group consisting of ethanol, acetone, DMAC and THF.

In an embodiment, the grafting reaction is performed at 20-40° C. for 1-24 h.

Example 1

Figure 1:
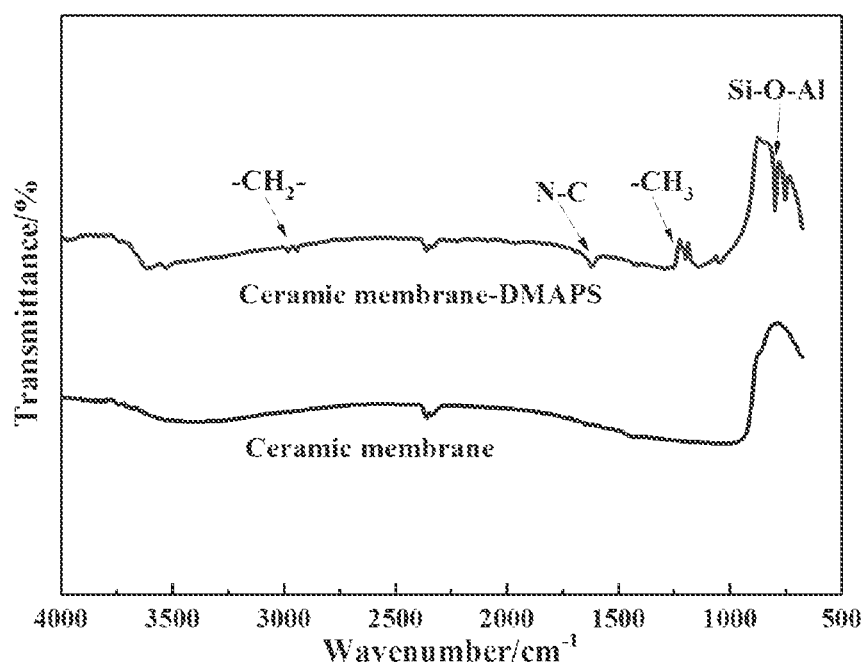
FIG. 1 is an infrared spectrum of an amination-modified porous membrane material.

An inner membrane of a tubular ceramic membrane with an average pore size of 100 nm (geometric dimensions of the membrane were as follows: an effective length was 8 cm, an outer diameter was 12 cm, an inner diameter was 8 cm and a porosity was about 40%) was washed and dried in a drying box for 1-2 h. A silane coupling agent N,N-dimethyl-3-aminopropyltrimethoxysilane (DMAPS) containing amine groups was added dropwise to absolute ethanol to dissolve to prepare a 15 mmol/L modifying solution. A porous membrane material was immersed in the modifying solution, to allow for full reaction for 12 h at a constant-temperature water bath of 35° C., and washing and drying were performed to obtain a membrane material with tertiary amine groups on a surface. A surface infrared spectrum of the modified membrane material is shown in FIG. 1. A structure of the DMAPS is as follows:

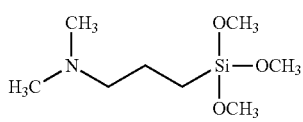

Comparing the infrared spectra of the membrane before and after the modification, it can be seen that the modified ceramic membrane has new characteristic peaks, which are the characteristic peaks of —$CH_2$—, N—C, —$CH_3$ and Si—O—Al marked in the figure, respectively. Especially, N—C at 1610 $cm^{-1}$ is a unique peak of the DMAPS, and there is a characteristic peak at 810 $cm^{-1}$ that demonstrates the Si—O—Al formed by the reaction of Si—OH and Al—OH.

The membrane material was soaked in water, and water was loaded in the membrane pores through surface tension, optionally this process could be accelerated by vacuuming. When no bubbles came out, the membrane material was taken out to gently wipe off the remaining water on the membrane surface, to obtain a supported liquid membrane that can separate the $CO_2$ gas mixture.

Figure 2:
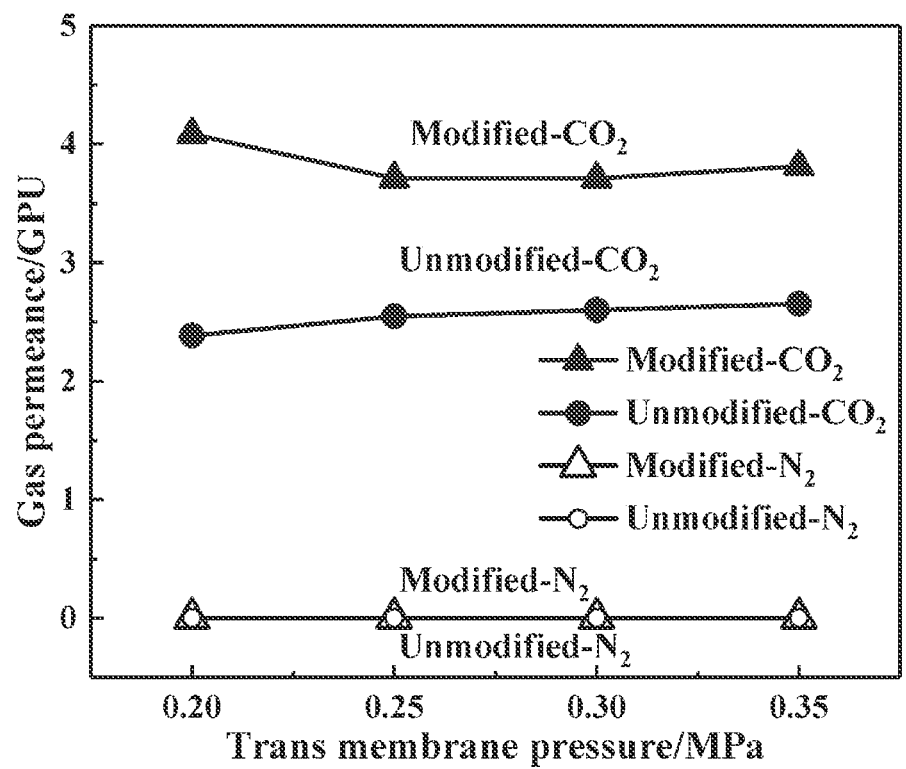
FIG. 2 shows an effect of a water-supported liquid membrane made of porous membrane materials before and after amination modification on gas permeance in a $CO_2$ separation system.

The prepared water-supported liquid membrane was installed in a membrane module to determine gas permeance of pure gas and the ideal separation factor. A gas permeance test was performed under 0.6 Mpa and 25° C. The results are as follows. An ideal separation factor of $CO_2/N_2$ is infinite. The unmodified membrane has a gas permeance of about 2.5±0.15 GPU for $CO_2$, and the modified membrane has a gas permeance of about 3.83±0.19 GPU for $CO_2$, which is about 53% higher than that of the unmodified membrane. The results are shown in FIG. 2.

Example 2

An inner membrane of a tubular ceramic membrane with an average pore size of 200 nm (geometric dimensions of the membrane were as follows: an effective length was 8 cm, an outer diameter was 12 cm, an inner diameter was 8 cm and a porosity was about 40%) was washed and dried in a drying box for 1-2 h. A silane coupling agent (3-aminopropyl) trimethoxysilane containing amine groups was added dropwise to acetone to dissolve to prepare a 50 mmol/L modifying solution. A porous membrane material was immersed in the modifying solution, to allows for full reaction for 24 h at a constant-temperature water bath of 30° C., and washing and drying were performed to obtain a membrane material with tertiary amine groups on a surface. The membrane material was used in gas adsorption of a gas-liquid membrane contactor, and water was used as an adsorbent. It is found that the $CO_2$ has a mass transfer flux increased from an initial 0.15 mol/($m^2$·h) to 0.209 mol/($m^2$·h), with an increase of about 40% relative to an initial flux.

Example 3

Figure 3:
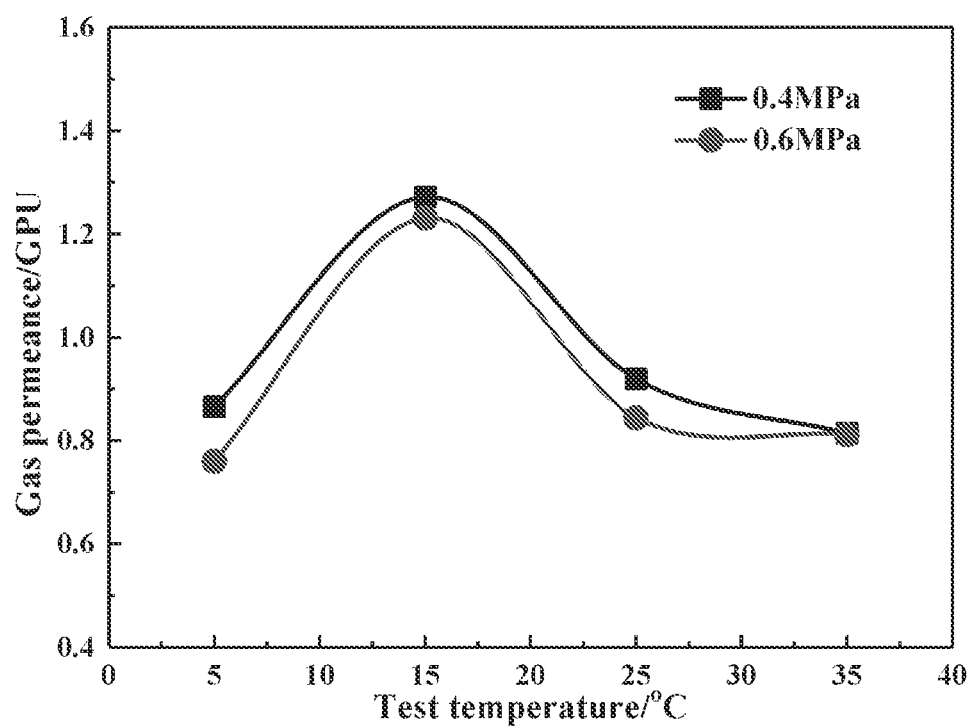
FIG. 3 shows an effect of temperature on gas permeance of $CO_2$ of a porous membrane without amination modification.

An influence of different operating temperatures on the permeation rate of $CO_2$ was investigated, as shown in FIG. 3.

For unmodified membranes (a tubular ceramic membrane with an average pore size of 20 nm was used, and geometric dimensions of the membrane were as follows: an effective length was 8 cm, an outer diameter was 12.5 cm, and an inner diameter was 7.5 cm; and a porosity was about 30%), and water was used as membrane liquid.

A permeation behavior of gas in the supported liquid membrane conformed to a dissolution-diffusion model: D (diffusion coefficient), S (solubility coefficient), J (gas permeance) and l (liquid membrane thickness).

$$P=S \times D=J \times l$$

The diffusion coefficient increases with the increase of temperature, and the solubility coefficient decreases with the increase of temperature, such that the gas permeance J could have an optimal value point.

What is claimed is:

1. A method of using a modified porous membrane material in improving a separation factor during a liquid membrane separation of carbon dioxide ($CO_2$), wherein the modified porous membrane material is prepared by a preparation method comprising the following steps: dissolving a silane coupling agent containing an amine group in an organic solvent to serve as a modifier; immersing an inorganic porous membrane material in the modifier for a grafting reaction; and after the grafting reaction is completed, performing washing and drying to obtain the modified porous membrane material, wherein the inorganic porous membrane material has an average pore size of 20 nm-200 nm, and the liquid membrane separation of the $CO_2$ comprises the following steps: loading water as a solvent into pore channels of the modified porous membrane material to form a liquid membrane; and allowing the liquid membrane to contact with a gas mixture containing the $CO_2$ to make the $CO_2$ permeate the liquid membrane.

2. The method of claim 1, wherein the amine group is one selected from the group consisting of a primary amine-containing group, a secondary amine-containing group, and a tertiary amine-containing group.

3. The method of claim 1, wherein the inorganic porous membrane material is selected from the group consisting of porous alumina, porous titania, porous zirconia, and porous silica.

4. The method of claim 1, wherein the inorganic porous membrane material geometrically has a flat-plate structure or a tubular structure.

5. The method of claim 1, wherein the silane coupling agent containing the amine group is selected from the group consisting of N,N-dimethyl-3-aminopropyltrimethoxysilane and (3-aminopropyl)trimethoxysilane; and the organic solvent is at least one selected from the group consisting of ethanol, acetone, dimethylacetamide (DMAC), and tetrahydrofuran (THF).

6. The method of claim 1, wherein the grafting reaction is performed at a temperature of 20° C.-40° C. for 1-24 h.

7. The method of claim 1, wherein the gas mixture containing the $CO_2$ further comprises at least one selected from the group consisting of $N_2$, $CH_4$, $H_2$, $O_2$, He, and CO.

* * * * *